United States Patent [19]
Niederer et al.

[11] Patent Number: 5,577,192
[45] Date of Patent: Nov. 19, 1996

[54] FRAME REGISTER SWITCHING FOR A VIDEO PROCESSOR

[75] Inventors: Theron P. Niederer, Raleigh; William R. Lee, Apex, both of N.C.; David C. Frank, Ossining, N.Y.

[73] Assignee: International Business Machines Corporation, Armonk, N.Y.

[21] Appl. No.: 616,243

[22] Filed: Mar. 13, 1996

Related U.S. Application Data

[63] Continuation of Ser. No. 332,686, Nov. 1, 1994.

[51] Int. Cl.⁶ ............................................. G06F 12/00
[52] U.S. Cl. ........................ 395/507; 395/501; 345/112
[58] Field of Search ............................. 395/162–166, 395/250, 425, 725, 775; 345/112, 119, 120, 201

[56] References Cited

U.S. PATENT DOCUMENTS

| | | | |
|---|---|---|---|
| 3,982,063 | 9/1976 | Brown et al. | 178/6 |
| 4,496,976 | 1/1985 | Swanson et al. | 358/147 |
| 5,091,717 | 2/1992 | Carrie et al. | 340/703 |

OTHER PUBLICATIONS

IBM Technical Disclosure Bulletin, vol. 20, No. 10, Mar. 1978, p. 4148 "Viewporting in an Alphanumeric Display" By: A. M. Robins and H. L. Rowe.

*Primary Examiner*—Kee Mei Tung
*Assistant Examiner*—U. Chauhan
*Attorney, Agent, or Firm*—Steven B. Phillips

[57] ABSTRACT

A video register interface for a video processor in which each frame register has a first storage element which is written by a microprocessor interface independently from a second storage element which outputs control data to video processing circuitry. Since reading and writing are done independently to different storage elements, the contents of the register can be changed without adverse effects on a displayed image. The register interface is used in a CMOS video processor which in turn is used in a microprocessor based multimedia computing system.

9 Claims, 4 Drawing Sheets

FRAME REGISTER SWITCHING FOR A VIDEO PROCESSOR

This application is a continuation of application Ser. No. 08/332,686 filed Nov. 1, 1994.

BACKGROUND

1. Field of the Invention

This invention is related to video processing for multimedia computer applications. More specifically, this invention is related to the management of updates to shift registers in register-based, integrated circuit video processors of the type used in multimedia workstations.

2. Definition of the Problem

The proliferation of microprocessor-based, multimedia computer systems and multimedia applications has created the need for improved integrated circuits for processing video. These integrated circuits must be capable of managing video data in real time. Many of the challenges related to managing video in real time are related to handling multiple, changing video images without producing visual artifacts or abrupt changes in the images as displayed. Such visual effects would be displeasing to users and thus undesirable.

There are numerous manufacturers of video processors for use in multimedia systems. Many aspects of the video processors sold by the assignee of the present invention are described in U.S. patent application Ser. No. 153,004, filed Nov. 12, 1993, assigned to the assignee of the present application, which is incorporated herein by reference.

One of the problems encountered in video processor design has to do with the management of registers. Data representing the manner in which images to be displayed (control data) is stored in a set of registers. Data representing the images themselves (image data) is stored in a video memory. The control data is derived from user input (for example, a user specifying the size and location of the video window with a mouse), or from input provided by a workstation program (for example, the resolution of the workstation monitor). Since computer displays display video as a series of still frames or images, each one scanned onto the display screen a line at a time, the image data in the video memory must be constantly updated, once for each frame. Similarly, the control data needs to be updated once per frame at a maximum, and should always be updated at a time when the workstation display is between images.

Modem video processors can display multiple video windows on a computer display simultaneously, by alternating the still frames displayed between video presentations. In most cases, a maximum of two video windows are supported. Each window is updated at half the rate that the overall display is updated, which is still fast enough that a user perceives the video in each window as full-motion. If the display is capable of updating itself fast enough; however, more video windows can be displayed simultaneously.

In the case where two video windows are displayed, the control data for each is stored in a register. One window's control data is said to be associated with the "odd" field image and is said to be stored in the "odd" register, and the other window's control data is said to be associated with the "even" field image and is said to be stored in the "even" register. In the current art, a register set consists of a single set of memory elements for storing control data associated with a single video image. If a register is updated while the video image is being scanned onto the display screen, the image viewed in the window associated with that register may be distorted or perturbed in such a way as to be displeasing to the user. Therefore, the timing of the updating of the registers must be carefully controlled so that one register is updated while a frame associated with the other register is being displayed. The timing of these register updates can not reasonably be accomplished by the microprocessor in the workstation because the microprocessor does not keep track of the presentation of images on the display. What is needed is a hardware-based frame register switching method that completely prevents the contents of a register from being updated while its associated image is being displayed, regardless of the time at which the contents of the register are written or read by the microprocessor.

SUMMARY

The present invention solves the problems discussed above by providing a programmable frame register interface for a video processor in which each register includes two storage elements arranged in a first-in-first-out (FIFO) configuration rather than a single storage element. Only the first storage element of each register is directly accessible by the microprocessor interface. In turn, only the second element of each register may output data to the video processing circuitry. When necessary, and on a programmable basis, the second storage element in the FIFO register is updated with the value in the first element. The registers output data to the video processing circuitry through a selector which is controlled synchronously with the image data. In the typical odd-even arrangement previously discussed there are two registers and two video windows can be displayed simultaneously; however, more registers can be used and controlled to output data to the same selector if more video windows are to be displayed simultaneously.

The video register interface of the present invention includes at least two buffering means or video registers in the preferred embodiment. Each one has first and second storage elements and each first storage element receives data from a microprocessor interface and transfers that data to the second storage element. Each storage element contains enough memory elements or cells to store data for controlling the presentation of a video frame. The video register interface also includes logic means for controlling the transfer timing of data from the first storage element to the second storage element of each buffering means. The video register interface further includes means for selectively outputting the data stored in each second storage element to video processing circuitry while allowing data in the first storage element to be overwritten. In the preferred embodiment the selectively outputting means is a selector.

In the preferred embodiment, the video register interface is part of a video processor integrated circuit further including microprocessor interface circuitry for connection to a microprocessor bus; video processing circuitry which further includes a digitizer interface and a codec interface; a video memory interface circuit for connection to a video memory; and an image processor.

A video processor integrated circuit utilizing the present invention is most typically used on an adapter card which is included in a computer system. The adapter card includes a video memory; means for connection to a video display; and means for connection to a computer system bus. The computer system also includes a main processor and a storage means such as a disk drive.

The present invention alleviates the need for complicated programming or circuitry to control the reads and writes of independent registers containing only single memory elements, because the reading and writing of the registers no longer have to be locked together to alternate so that a read and write is not attempted at the same time with the same register.

DETAILED DESCRIPTION OF THE PREFERRED EMBODIMENT

Figure 1:
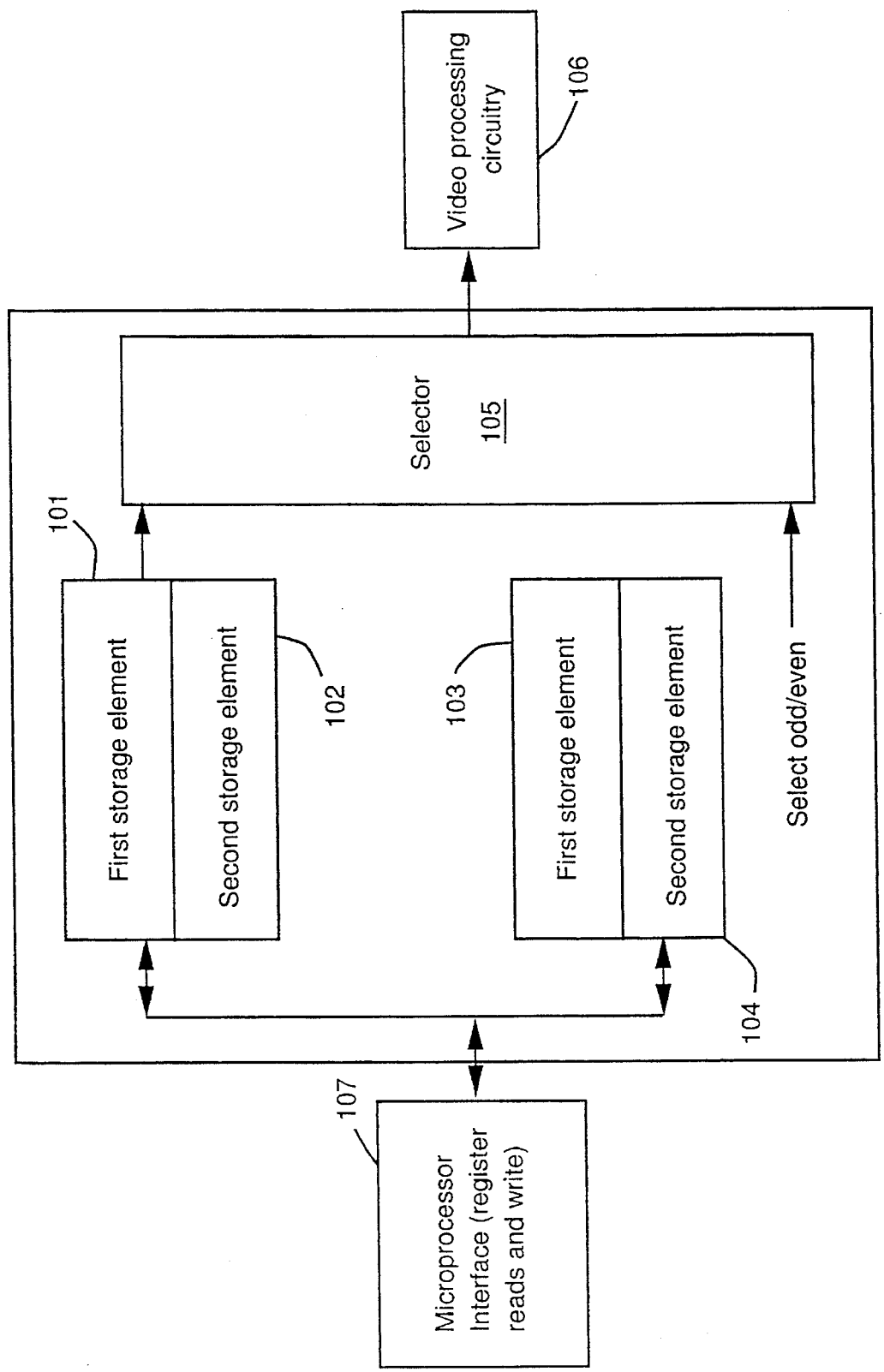
FIG. 1 is a block diagram of a video register interface according to the present invention.

FIG. 1 shows a block diagram of the video frame register interface 201 of the current invention and how it is connected to other circuitry in a typical environment. The microprocessor interface 107 serves as the source of control data for the registers. The microprocessor interface reads digital data which originates from user specifications and workstation system configuration. The register interface of FIG. 1 has two frame registers, and each frame register is made up of a two-storage element FIFO buffer. One frame register is made up of storage elements 101 and 102 and the other frame register is made up of storage elements 103 and 104. Each storage element actually comprises enough memory elements to hold the data required to control an entire frame of image data. The selector 105 is controlled through a programming interface. Notice that only the first storage element of each register may receive data from the microprocessor interface, and only the second storage element of each register may output data to the selector 105. This arrangement allows new control values to be written by the microprocessor at any time without disturbing the control values associated with the current image being displayed. The output of the selector drives video processing circuitry 106. This video processing circuitry includes an image processor and other circuitry to be described below.

Figure 2:
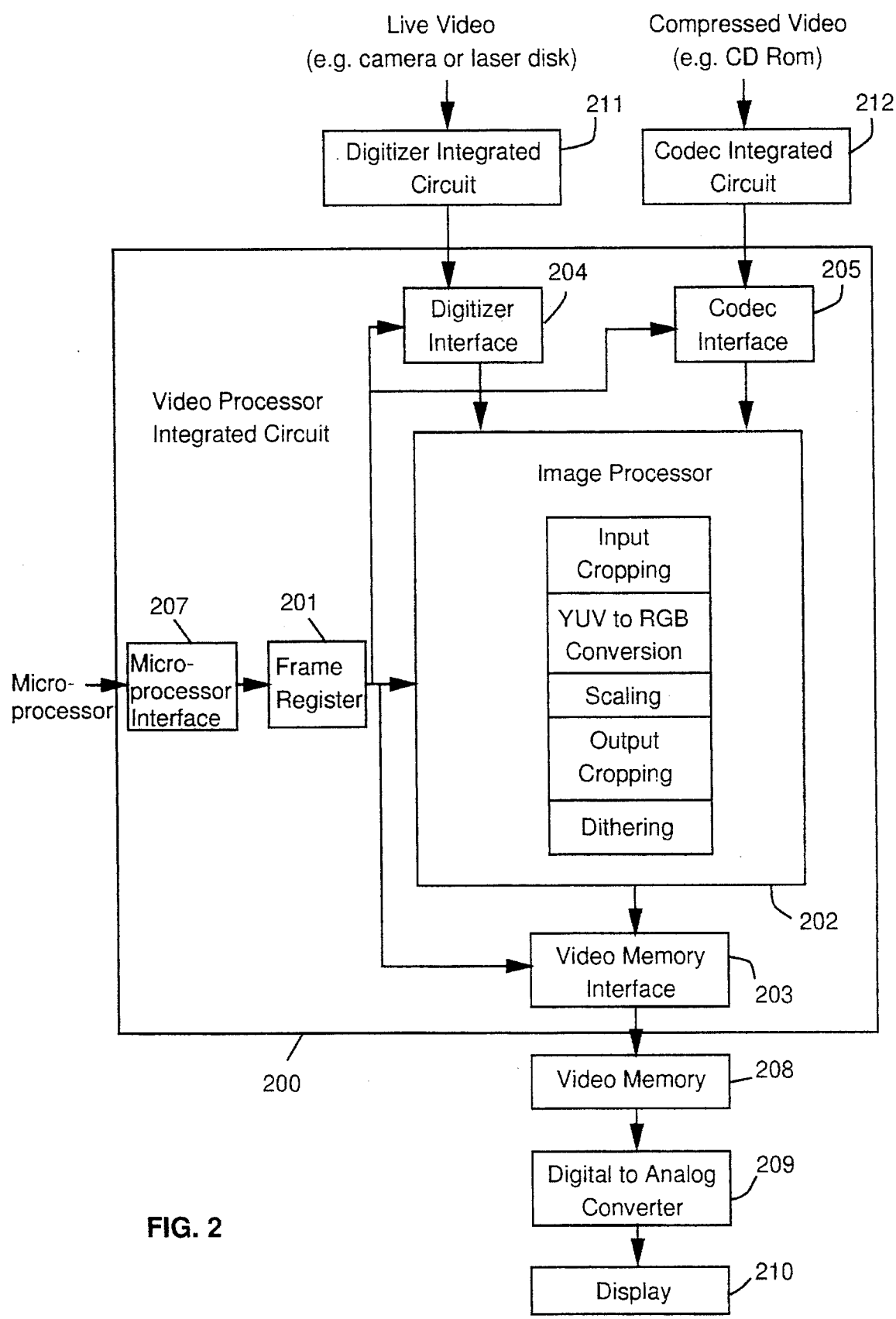
FIG. 2 is a block diagram of a video processor integrated circuit in which the video register interface of FIG. 1 finds use.

FIG. 2 shows a block diagram of a video processor chip 200 in which the register interface 201 of FIG. 1 is used. The microprocessor interface 207 is connected to the microprocessor through a microprocessor bus, and to the frame register interface of FIG. 1, 201. The frame register interface outputs control data from one register or the other such that control values for the even field are in effect when the even image is being processed and control values for the odd field are in effect when the odd image is being processed.

The video processor integrated circuit chip 200 includes digitizer and codec interfaces 204 and 205, an image processor 202 and a video memory interface 203. The digitizer interface provides a standard interface for a digitizer integrated circuit 211 commonly used to convert live video signals, for example a camera signal, to digital format. The codec interface provides an input port for a codec integrated circuit 212 commonly used to decompress a previously compressed video signal such as a video signal from a CD-ROM. Note that in FIG. 2, the signal path for image data is shown with a heavy line. The signal path for control data is shown with a light line and passes through the frame register interface 201 of the present invention. The video processor integrated circuit chip provides video image data to the video memory 208 through a video memory bus. The video image data stored within the video memory 208 is later read out of video memory and sent to a display 210 through a digital to analog converter 209.

The image processor 202 includes circuitry typically required for various video processing operations. Examples are circuitry for input cropping, YUV to RGB conversion, scaling, output cropping and dithering. Although the image processor 202, is a significant feature of the overall video processor integrated circuit chip, it is not important to the present invention and so it will not be discussed in further detail.

Figure 3:
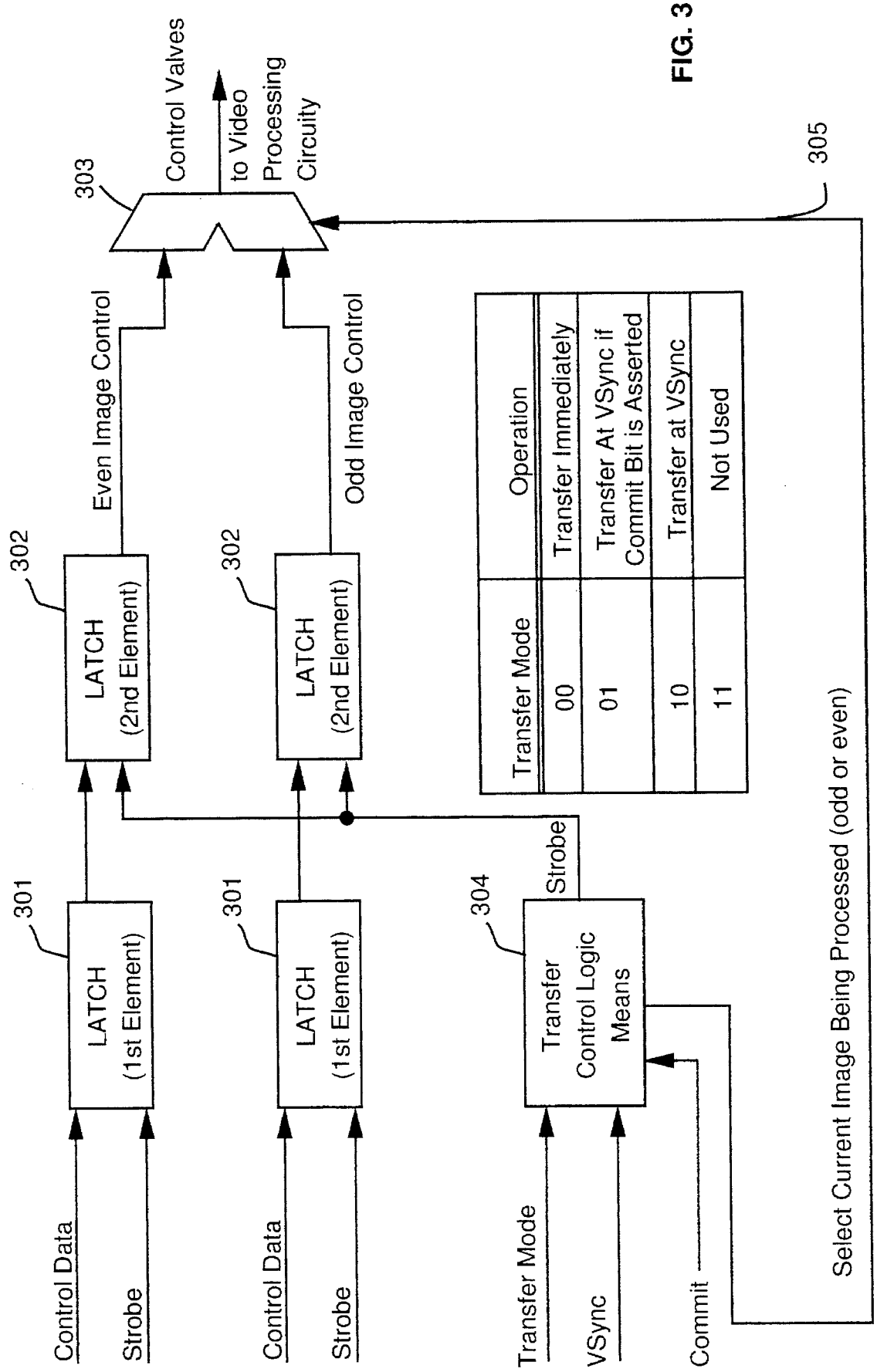
FIG. 3 is a logic diagram showing the detailed design of the video register interface of the present invention.

FIG. 3 shows a detailed schematic logic diagram of the preferred embodiment of the register interface of FIG. 1. In this embodiment, the register interface has two buffering means or registers. Each has two memory elements, which in this case are latches. Each has a first memory element 301 and a second memory element 302. One buffering means is for control information for the even image and the other is for control information for the odd image as indicated. A selector 303 controls which buffering means is outputting data to the video processing circuitry. A "select current image" line 305 controls the selector 303.

Block 304 of FIG. 3 is the logic means for controlling among other things, the timing of the transfer of data from first storage elements 301 to second storage elements 302. The logic means 304 prevents an update to a second storage element from occurring while the control data in the register for that element is controlling the currently displayed image. The logic means can be set to various transfer modes under program control. The mode control for the logic means has two lines, and each line may be a logic zero or a logic one. Also, the vertical synchronization signal for the video processor (VSYNC) is input to the logic means 304. With this arrangement, it is possible to cause the second storage means, latches 302 to be updated in various different ways under program control. In the preferred embodiment, when the mode control bits are set to 00, data is transferred from a latch 301 to a latch 302 immediately. When the mode control is set to 01, data is transferred at the next VSYNC if a commit bit is asserted. When the mode control bits are set to 10, data is transferred at the next VSYNC. In this embodiment, the mode control bit combination 11 is not used. These combinations are shown in the logic table. The COMMIT bit shown in FIG. 3 is asserted or not asserted by software control to ensure that a transfer is not done at vertical sync while the software driver is writing to the first storage element latches.

The logic means 304 of FIG. 3 also controls the selector 303 via the select line 305. In the preferred embodiment, the logic means 304 simply causes the selector to switch between even and odd on vertical sync; however, other control schemes are possible. It is also possible to have a more elaborate means than a simple selector for selecting which buffering means supplies data to the video processing circuitry. Such elaborate means for selecting may include logic circuitry which receives additional information from the logic means 304.

Figure 4:
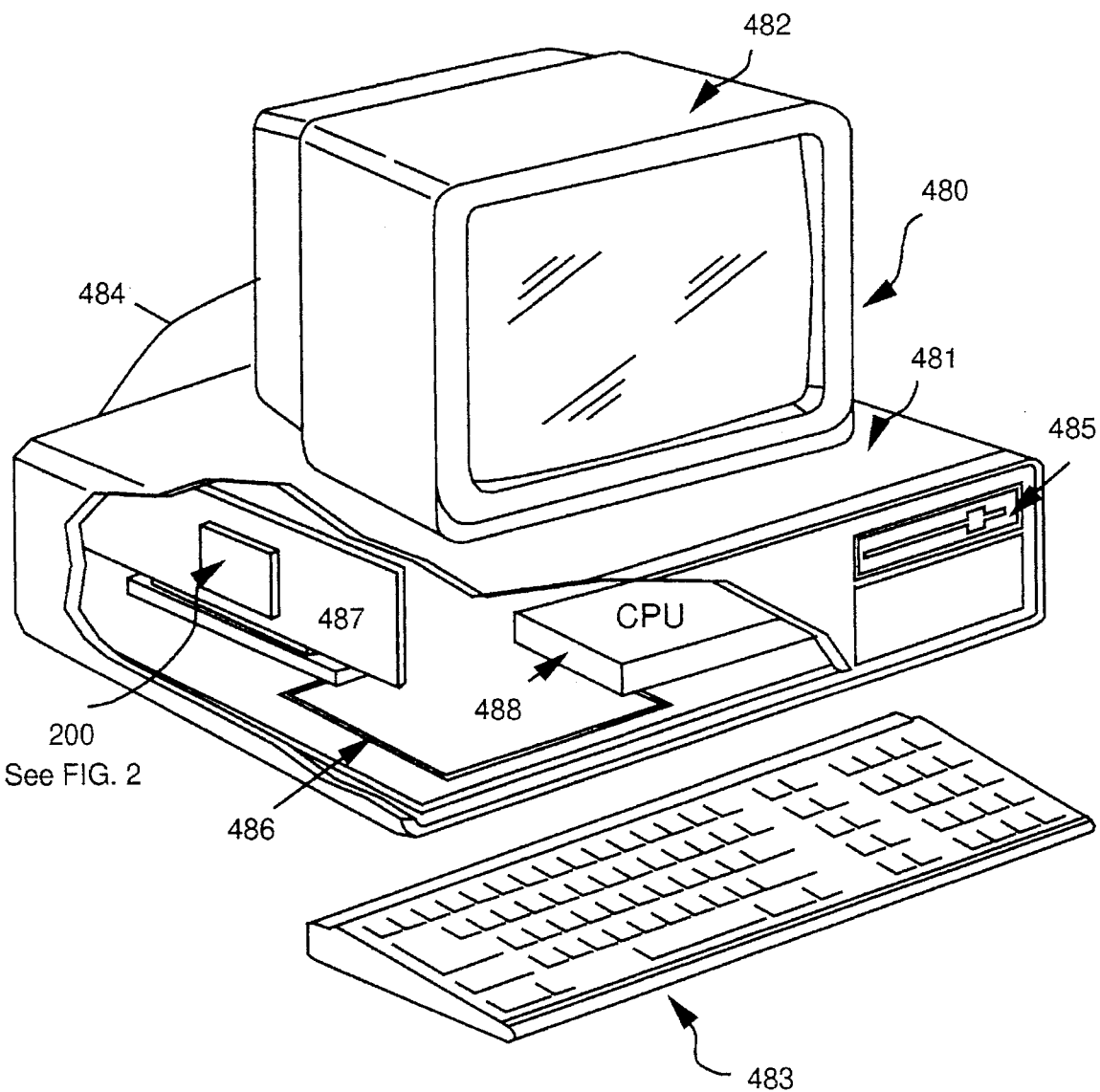
FIG. 4 is a diagram of a computer system that shows a typical operating environment for the video processor integrated circuit of FIG. 2.

FIG. 4 shows a specific implementation of the present invention, on a CMOS video processor integrated circuit chip within a microprocessor based computer system 480. System 480 includes display 482, disk storage means 485, and keyboard 483. Chassis 481 encloses various computer hardware (not shown) typical of microprocessor-based computing systems. Within chassis 481, the central processing unit ("processor") 488 is coupled via bus 486 to one or more peripheral adapters which comprise one or more adapter cards 487. An adapter card 487 includes the video processor chip 400, a circuit block diagram of which is shown in FIG. 2. The adapter also has means for connection to a video display which is connected to a cable 484 to send video to the video display 482. While this is one implementation of the invention, it will be readily understood to one of skill in the video processor art that the present invention has many possible implementations.

We claim:

1. A video register interface for a video processor comprising:

at least two buffers, each buffer having first and second storage elements, the first storage element of a given buffer disposed to receive data from a microprocessor interface and to transfer that data to the second storage element of the given buffer, the second storage element of the given buffer disposed to receive data only from the first storage element of the given buffer;

logic for controlling timing of the transfer of data from the first storage element to the second storage element of the given buffer and for controlling outputting of data from the second storage element of the given buffer to video processing circuitry, the logic for controlling timing being connected to transfer mode control lines which allow the selection of one of a plurality of transfer modes, a selected transfer mode specifying the timing of the transfer from the first storage element to the second storage element of the given buffer; and logic for selectively outputting data stored in the second storage element of a selected buffer to the video processing circuitry while allowing data in the first storage element of the selected buffer to be overwritten.

2. The video register interface of claim 1 wherein the logic for selectively outputting data comprises a selector.

3. A video processor integrated circuit comprising:

microprocessor interface circuitry for connection to a microprocessor bus;

video processing circuitry having means for receiving a video signal and means for outputting data to a video memory; and a video register interface disposed between the microprocessor interface circuitry and the video processing circuitry, the video register interface including:

at least two buffers, each buffer having first and second storage elements, the first storage element of a given buffer disposed to receive data from the microprocessor interface circuitry and to transfer that data to the second storage element of the given buffer, the second storage element of the given buffer disposed to receive data only from the first storage element of the given buffer;

logic for controlling timing of the transfer of data from the first storage element to the second storage element of the given buffer and for controlling outputting of data from the second storage element of the given buffer to the video processing circuitry, the logic for controlling timing being connected to transfer mode control lines which allow the selection of one of a plurality of transfer modes, a selected transfer mode specifying the timing of the transfer from the first storage element to the second storage element of the given buffer; and logic for selectively outputting data stored in the second storage element of a selected buffer to the video processing circuitry while allowing data in the first storage element of the selected buffer to be overwritten.

4. The video processor integrated circuit of claim 3 wherein the logic for selectively outputting data comprises a selector.

5. The video processor integrated circuit according to claim 3 or claim 4 wherein the video processing circuitry includes:

a digitizer interface circuit disposed to receive the video signal from a digitizer integrated circuit;

a codec interface circuit disposed to receive the video signal from a codec integrated circuit;

a video memory interface circuit for outputting the video data to the video memory; and an image processor disposed between the digitizer and codec interface circuits and the video memory interface circuit.

6. An adapter card for use in a computer system, the adapter card comprising:

a video memory;

means for connection to a video display, the means connected to the video memory;

means for connection to a computer system bus; and a video processor integrated circuit disposed between a video bus and the means for connection to the computer system bus, the video processor integrated circuit including:

microprocessor interface circuitry for connection to the system bus;

video processing circuitry having means for receiving a video signal and means for outputting data to the video memory; and a video register interface disposed between the microprocessor interface circuitry and the video processing circuitry, the video register interface including:

at least two buffers, each buffer having first and second storage elements, the first storage element of a given buffer disposed to receive data from the microprocessor interface circuitry and to transfer that data to the second storage element of the given buffer, the second storage element of the given buffer disposed to receive data only from the first storage element of the given buffer;

logic for controlling timing of the transfer of data from the first storage element to the second storage element of the given buffer and for controlling outputting of data from the second storage element of the given buffer to the video processing circuitry, the logic for controlling timing being connected to transfer mode control lines which allow the selection of one of a plurality of transfer modes, a selected transfer mode specifying the timing of the transfer from first storage element to the second storage element of the given buffer; and logic for selectively outputting data stored in the second storage element of a selected buffer to the video processing circuitry while allowing data in the first storage element of the selected buffer to be overwritten.

7. The adapter card of claim 6 wherein the logic for selectively outputting data comprises a selector.

8. The adapter card according to claim 6 or claim 7 wherein the video processing circuitry includes:

a digitizer interface circuit disposed to receive the video signal from a digitizer integrated circuit;

a codec integrated circuit disposed to receive the video signal from a codec integrated circuit;

a video memory interface circuit for outputting the video data to the video memory; and an image processor disposed between the digitizer and codec interface circuit and the video memory interface circuit.

9. A computer system comprising:

a processor;

a storage means;

a system bus coupling the processor and the storage means to one or more adapter card connectors; and at least one adapter card connected to the computer system through an adapter card connector, the adapter card including:

a video memory;

means for connection to a video display, the means connected to the video memory;

means for connection to a computer system bus; and a video processor integrated circuit disposed between the video bus and the means for connection to the computer system bus, the video processor integrated circuit including:

microprocessor interface circuitry for connection to the system bus;

video processing circuitry having means for receiving a video signal and means for outputting data to the video memory; and a video register interface disposed between the microprocessor interface circuitry and the video processing circuitry, the video register interface including:

at least two buffers, each having first and second storage elements, the first storage element of a given buffer disposed to receive data from the microprocessor interface circuitry and to transfer that data to the second storage element of the given buffer, the second storage element of the given buffer disposed to receive data only from the first storage element of the given buffer;

logic for controlling timing of the transfer of data from the first storage element to the second storage element of the given buffer and for controlling outputting of data from the second storage element of the given buffer to the video processing circuitry, the logic for controlling timing being connected to transfer mode control lines which allow the selection of one of a plurality of transfer modes, a selected transfer mode specifying the timing of the transfer from the first storage element to the second storage element of the given buffer; and logic for selectively outputting data stored in the second storage element of a selected buffer to the video processing circuitry while allowing data in the first storage element of the selected buffer to be overwritten.

* * * * *